US007242162B2

(12) United States Patent
Goth

(10) Patent No.: US 7,242,162 B2
(45) Date of Patent: Jul. 10, 2007

(54) APPARATUS AND METHOD FOR RETRACTING AWNING

(75) Inventor: Mark Goth, Loveland, CO (US)

(73) Assignee: Carefree/Scott Fetzer Company, Broomfield, CO (US)

( * ) Notice: Subject to any disclaimer, the term of this patent is extended or adjusted under 35 U.S.C. 154(b) by 0 days.

(21) Appl. No.: 10/996,282

(22) Filed: Nov. 22, 2004

(65) Prior Publication Data

US 2006/0113936 A1 Jun. 1, 2006

(51) Int. Cl.
*H02P 1/04* (2006.01)
*G05B 15/00* (2006.01)

(52) U.S. Cl. ...................... 318/480; 318/460; 318/466; 318/468; 160/7; 700/275

(58) Field of Classification Search ................ 318/460, 318/375, 481, 445, 434, 466; 160/22, 66, 160/67, 84.02, 171
See application file for complete search history.

(56) References Cited

U.S. PATENT DOCUMENTS

| | | | | |
|---|---|---|---|---|
| 3,779,302 | A * | 12/1973 | Akers et al. | 160/68 |
| 3,990,063 | A * | 11/1976 | Schuman | 340/544 |
| 3,990,069 | A * | 11/1976 | Schuman | 340/544 |
| 4,160,458 | A * | 7/1979 | Marcellus | 160/67 |
| 4,351,192 | A * | 9/1982 | Toda et al. | 73/861.18 |
| 4,519,554 | A * | 5/1985 | Dussoliet et al. | 242/390.9 |
| 4,542,325 | A * | 9/1985 | Kobayashi et al. | 318/483 |
| 4,615,214 | A * | 10/1986 | Burns | 73/170.15 |
| 5,038,087 | A * | 8/1991 | Archer et al. | 318/469 |
| 5,170,108 | A * | 12/1992 | Peterson et al. | 318/469 |
| 5,225,748 | A * | 7/1993 | Haring | 318/266 |
| 5,307,856 | A * | 5/1994 | Murray | 160/70 |
| 5,760,558 | A * | 6/1998 | Popat | 318/480 |
| 5,850,131 | A * | 12/1998 | Wolfer et al. | 318/466 |
| 6,215,265 | B1 * | 4/2001 | Wolfer et al. | 318/434 |
| 6,283,190 | B1 * | 9/2001 | Hu et al. | 160/84.02 |
| 6,341,638 | B1 | 1/2002 | Thompson et al. | |
| 6,370,949 | B1 * | 4/2002 | Zysko et al. | 73/170.15 |
| 6,465,902 | B1 * | 10/2002 | Beauchamp et al. | 290/55 |
| 6,484,069 | B2 * | 11/2002 | Osinga | 700/275 |
| 6,680,594 | B2 * | 1/2004 | Collett et al. | 318/280 |
| 6,708,750 | B2 * | 3/2004 | Collett et al. | 160/84.02 |
| 6,769,873 | B2 * | 8/2004 | Beauchamp et al. | 416/3 |
| 6,782,936 | B1 * | 8/2004 | Girard et al. | 160/66 |
| 6,798,158 | B2 * | 9/2004 | Evans | 318/266 |
| 6,924,615 | B2 * | 8/2005 | Cavarec et al. | 318/466 |
| 7,002,310 | B2 * | 2/2006 | Cavarec et al. | 318/375 |

(Continued)

FOREIGN PATENT DOCUMENTS

EP 1069257 1/2001

(Continued)

*Primary Examiner*—Paul Ip
(74) *Attorney, Agent, or Firm*—Dorsey & Whitney LLP

(57) ABSTRACT

An apparatus and method for retracting an awning. A sensor detects an awning acceleration caused by wind impacting the awning, and generates a signal having an amplitude corresponding thereto. When the signal exceeds a certain threshold, the awning is retracted. The signal's amplitude may be converted into a frequency, and the frequency compared to the threshold. The signal typically must exceed the threshold for a set period of time to trigger awning retraction. A second threshold may dictate a maximum instantaneous or peak acceleration; when the signal exceeds this second threshold, regardless of the duration during which the second threshold is exceeded, the awning is retracted.

34 Claims, 5 Drawing Sheets

U.S. PATENT DOCUMENTS

2002/0190678 A1 * 12/2002 Huber et al. ................ 318/434
2003/0069670 A1 * 4/2003 Osinga ....................... 700/275
2003/0075283 A1 * 4/2003 Collett et al. ............ 160/84.02
2003/0205978 A1 * 11/2003 Lee ............................ 318/445
2004/0031321 A1 2/2004 Orsat
2004/0067134 A1 * 4/2004 Beauchamp et al. .......... 416/37
2004/0075411 A1 * 4/2004 Evans ........................ 318/481
2005/0184691 A1 * 8/2005 Cavarec et al. ............. 318/375

FOREIGN PATENT DOCUMENTS

EP 1413694 A2 * 4/2004

* cited by examiner

APPARATUS AND METHOD FOR RETRACTING AWNING

BACKGROUND OF THE INVENTION

1. Technical Field

The present invention relates generally to a method and apparatus for retracting an awning, and more particularly to retracting an awning in response to detecting a wind acceleration persisting over a predetermined time period, or a wind speed exceeding a maximum threshold or a predetermined combination thereof.

2. Background Art

Awnings are used to provide shade from the sun in a variety of settings. Recreational vehicles may have retractable awnings providing a relaxing setting for people when the vehicle is parked, for example. However, excessive weather conditions, such as high wind velocities, can damage such awning if they are not retracted to be protected from the weather conditions. It is to automatically protect such awnings in excessive weather conditions that the present invention has been developed.

SUMMARY OF THE INVENTION

One embodiment of the invention takes the form of an apparatus for retracting an awning in response to a wind acceleration. In the present embodiment, the retraction of the awning occurs under either of two conditions: first, when an average wind force exceeds a first target value (a "sustained wind force") for a predetermined time period; and second, when a wind force exceeds a second target value (a "peak wind force"), regardless of the time during which the wind force exceeds the peak wind force. It should be noted that an alternative embodiment may require a wind force to constantly exceed the sustained wind force during the aforementioned time period to retract the awning. Yet another embodiment may require the wind force to exceed the sustained wind force a certain number of times during the time period to retract the awning.

Generally, the present embodiment takes the form of an apparatus attached to an outer edge of an awning. The embodiment typically includes a piezoelectric element, such as a piezoelectric film, which is at least partially exposed to atmosphere. The piezoelectric element is fixed at one end (typically the end opposite that exposed to atmosphere), permitting the element to oscillate as wind blows across the element. A tube or other guide structure may channel wind to the piezoelectric element and also reduce any crosswind.

Acceleration of the piezoelectric element generates an electrical signal. The signal's amplitude varies with the acceleration of the piezoelectric element, as known in the art. That is, the signal measures acceleration of the piezoelectric element, rather than velocity of the element. The signal typically serves as an input to a motor control device. The motor control device may condition the signal (for example, by subjecting the signal to one or more filters, converting the signal from analog to digital, amplifying the signal, and so forth) and actuate the motor when the signal exceeds certain parameters, as discussed above. The motor control device may include a signal conditioning circuit and a microcontroller, among other elements.

The present invention also embraces a method for retracting an awning. The invention generates a first signal corresponding to an awning acceleration, and in response to generating the signal, retracts the awning. Additional features and advantages of the present invention will become apparent upon reading the detailed description, below.

DETAILED DESCRIPTION OF THE INVENTION

Figure 1:
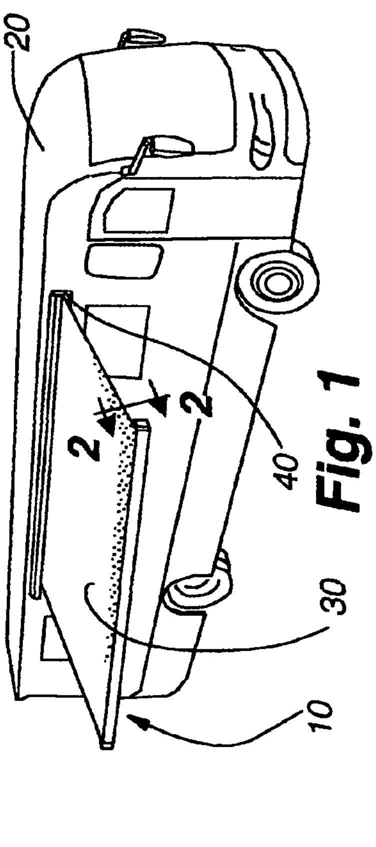
FIG. 1 depicts an awning having a first embodiment of the present invention installed thereon.

FIG. 1 depicts an awning 10 attached to a motor coach 20. The awning 10 in its extended position projects generally outwardly from the side of the coach 20. As shown in FIG. 1, the awning 10 consists of at least a canopy or fabric panel 30 extending outwardly from a mounting rail 40 securing the awning to the coach, and the rail itself. A roll bar 50 (see FIG. 2) is positioned along the awning edge furthest from the mounting rail 40, and generally extends parallel with the mounting. The roll bar 50 provides a base around which the canopy 30 can be wrapped or unwrapped when the awning 10 is retracted or extended respectively. Additional bracing elements, such as a retractable frame or support structure, may provide stabilization and/or further rigidity for the awning 10. Such bracing elements interconnect the mounting rail 40 and the roll bar 50. A pole or other support arm may extend from the roll bar 50 to the ground or side of the coach to prop up the awning 10.

A reversible motor (not shown) is generally also attached to the awning 10, usually within or adjacent to the roll bar 50. The motor operates to extend and retract the awning 10 in a manner known to those skilled in the art by rotating the roll base in one direction or the other.

Figure 2:
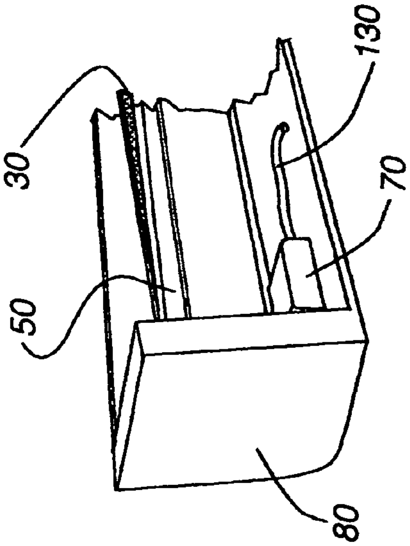
FIG. 2 is a cross-sectional view taken along line 2—2 of FIG. 1, depicting a first view of an apparatus for retracting an awning.
Figure 3:
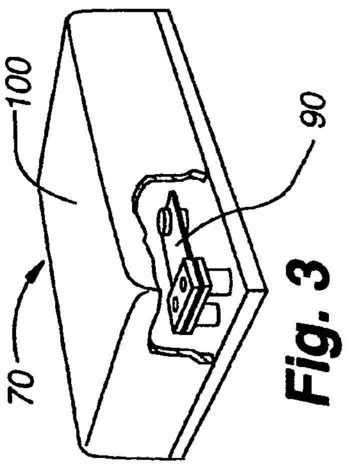
FIG. 3 depicts the apparatus for retracting an awning of FIG. 2 in partial cut-away.

FIGS. 2 and 3 generally depict a first embodiment 70 of the present invention affixed to a housing 80 in which the roll bar is mounted. The embodiment takes the form of a wind force speed measurement device 70. The device includes a piezoelectric film, or sensor 90, mounted in a casing 100 (see FIG. 3). In the present embodiment, the casing 100 is sealed about the piezoelectric film 90 and fastened to an edge of the awning 10, such as adjacent to the awning's roll bar 50. As shown to best effect in FIG. 2, the casing is typically positioned beneath the canopy and within the housing, and is thus enclosed on four sides. Thus, as the awning edge or roll bar moves, so does the casing and enclosed piezoelectric sensor.

In alternate embodiments, the casing 100 may be open at one end to permit wind to enter the casing. In such an embodiment, the wind may act directly on the piezoelectric sensor 90, and the open portion of the casing may extend through the housing 80 or roll bar 50.

Figure 4:
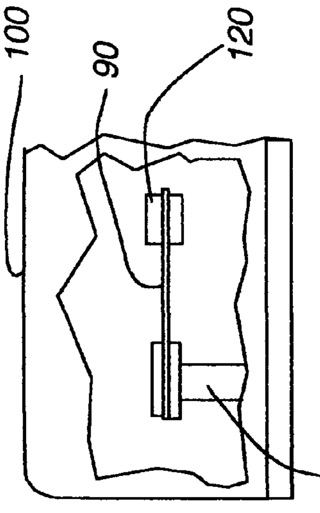
FIG. 4 depicts a cross-sectional view of the apparatus for retracting an awning shown in FIGS. 2 and 3.

The piezoelectric sensor 90, shown to best effect in FIGS. 3 and 4, is contained within the casing 100 and mounted thereto by at least one fastener 110. The sensor is typically cantilevered, such that one end of the sensor may freely oscillate. The fasteners 110, which may be screws, posts, nails, columns adhered to the casing, Velcro tabs, and so forth, couple the sensor 90 to the casing 100, such that the sensor's free end oscillates as the casing moves. Thus, the piezoelectric sensor may record movement of the casing and associated, affixed awning. The sensor 90 may be weighted at one end by a weight 120 to enhance oscillation.

The piezoelectric sensor 90 is generally electrically connected to a motor controller (not shown). The present embodiment 70 uses a standard telephone cord 130 to connect the sensor 90 to the motor controller, although alternative connections may be used in different embodiments. For example, alternative embodiments might employ a single-or multi-strand conductor terminating in a cable prong, RCA jack, coaxial input, and so forth. Other embodiments may wirelessly couple the sensor 90 and motor controller, for example, by means of a radiofrequency (RF) or infrared transmitter.

The motor controller generally activates and/or deactivates the previously-mentioned motor, which in turn is operative to retract (and, in some embodiments, extend) the awning 10. The motor controller activates the motor in response to an input signal. Parameters for activating the motor are described in more detail below with respect to FIG. 6.

In the present embodiment, the signal does not pass from the sensor 90 directly to the motor controller. Instead, the signal is first typically conditioned by a conditioning circuit, and also converted from an analog to a digital signal by a microcontroller. The microcontroller may also perform the duties of the conditioning circuit, such as filtering the input signal. The microcontroller (or a separate circuit) may also amplify the signal or process it in manners not further described herein. The operation of the conditioning circuit and/or microcontroller is discussed in more detail with respect to the flowchart of FIG. 6.

Returning to FIG. 2, the sensor casing 100 is generally affixed directly to the housing 80 for the roll bar 50. The exact positioning of the casing 100 with respect to the awning 10 may be of minimal importance, since any awning motion will shift the casing and thus the piezoelectric sensor 90. Some embodiments of the present invention may operate more efficiently if the piezoelectric sensor 90 is aligned with the longitudinal axis of the awning housing 80, to ensure the axes of sensor and awning are aligned and experience the same motion vectors.

The sensor 90 of the present embodiment 70 may be configured to actuate the motor controller, which in turn may acuate the motor, when certain, user-specified, conditions are met. For example, the embodiment may retract an awing 20 only when awing acceleration (as extrapolated from the force exerted on an awing by the wind, or "wind force") exceeds a user-chosen constant. The embodiment may include multiple such constants, generally corresponding to "high," "medium," and "low" acceleration. The embodiment 70 may similarly be configured to extend the awing 10 when acceleration drops below the user-chosen constant, or after a certain time has passed.

Figure 5:
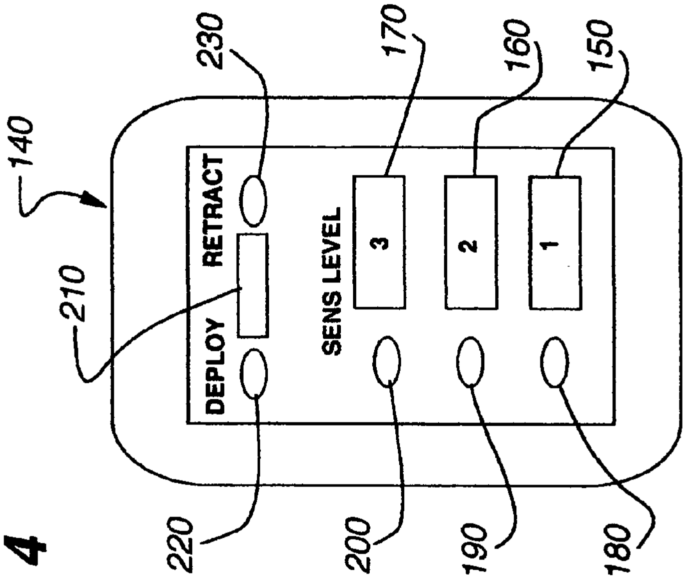
FIG. 5 depicts a control panel for use with the apparatus of FIGS. 1 and 2.

The user may configure the embodimnet 70 and choose from among the various parameters through use of the control panel 140 depicted in FIG. 5. The panel has three level buttons 150, 160, 170, labeled "1," "2," and "3." Each level button corresponds to a different level of acceleration that may be experienced by the awing 20 before the sensor 90 signals to activate the motor controller. In some embodiments, a user may also be able to select a duration during which the acceleration must persist before the awing 10 is retracted. A sensor level light 180, 190, 200 corresponds to each level button, and illuminates when the corresponding level button is pressed.

It should be noted, with respect to the present embodiment, the chosen level of acceleration is actually an average acceleration, and must be experienced for a minimum duration before the awning 10 is withdrawn. Thus, references to the acceleration required for retracting an awning 10 are meant to include a time-averaged acceleration. Further, in the present embodiment the averaged acceleration of the awning must exceed the average acceleration chosen by the user for at least two seconds before the awning will retract. Having a minimum duration minimizes the likelihood that the awning may retract accidentally, or when a single gust of wind impacts the awning. Alternate embodiments may have a greater or lesser minimum duration.

Additionally, since the awning 10 may be damaged by a single severe gust, the present embodiment may retract the awning when the awning experiences a sufficiently high acceleration, regardless of the duration of the acceleration. Thus, the present embodiment typically includes a maximum acceleration parameter. When the input signal generated by the sensor 90 exceeds this parameter, even briefly, the awning is retracted. Although the present embodiment does not permit a user to alter the maximum acceleration parameter, alternative embodiments may.

Returning to the discussion of the control panel 140, FIG. 5 also depicts a mode switch 210. The mode switch may be placed in two positions: deploy and retract. When the mode switch is in the deploy position, the awning 10 will extend. When the mode switch is in the retract position, the awning is retracted. Indicator lights illuminate to designate which mode is active.

As known to those skilled in the art, piezoelectric sensors 90 generally produce an electrical signal varying directly with acceleration of the sensor, rather than with motion (velocity) of the sensor. Thus, the input signal generated by the piezoelectric sensor as the awning 10 and casing 100 move corresponds to the acceleration of the awning, rather than the awning's velocity. Thus, as wind impacts the awning 10, the sensor 90 tracks the acceleration of the awning, not its actual motion. Nonetheless, the awning must move to accelerate; acceleration is the first derivative of velocity. Thus, the piezoelectric sensor's 90 signal may be extrapolated to indicate a motion. For example, converting the amplitude of the input signal generated by the sensor 90 to a frequency would yield a signal whose frequency increases as the awning acceleration increases, and decreases as the awning acceleration decreases. Thus, the frequency of the converted input signal (referred to herein as the "control signal") is zero when the awning is stationary, and increases with increased motion and acceleration.

Figure 6:
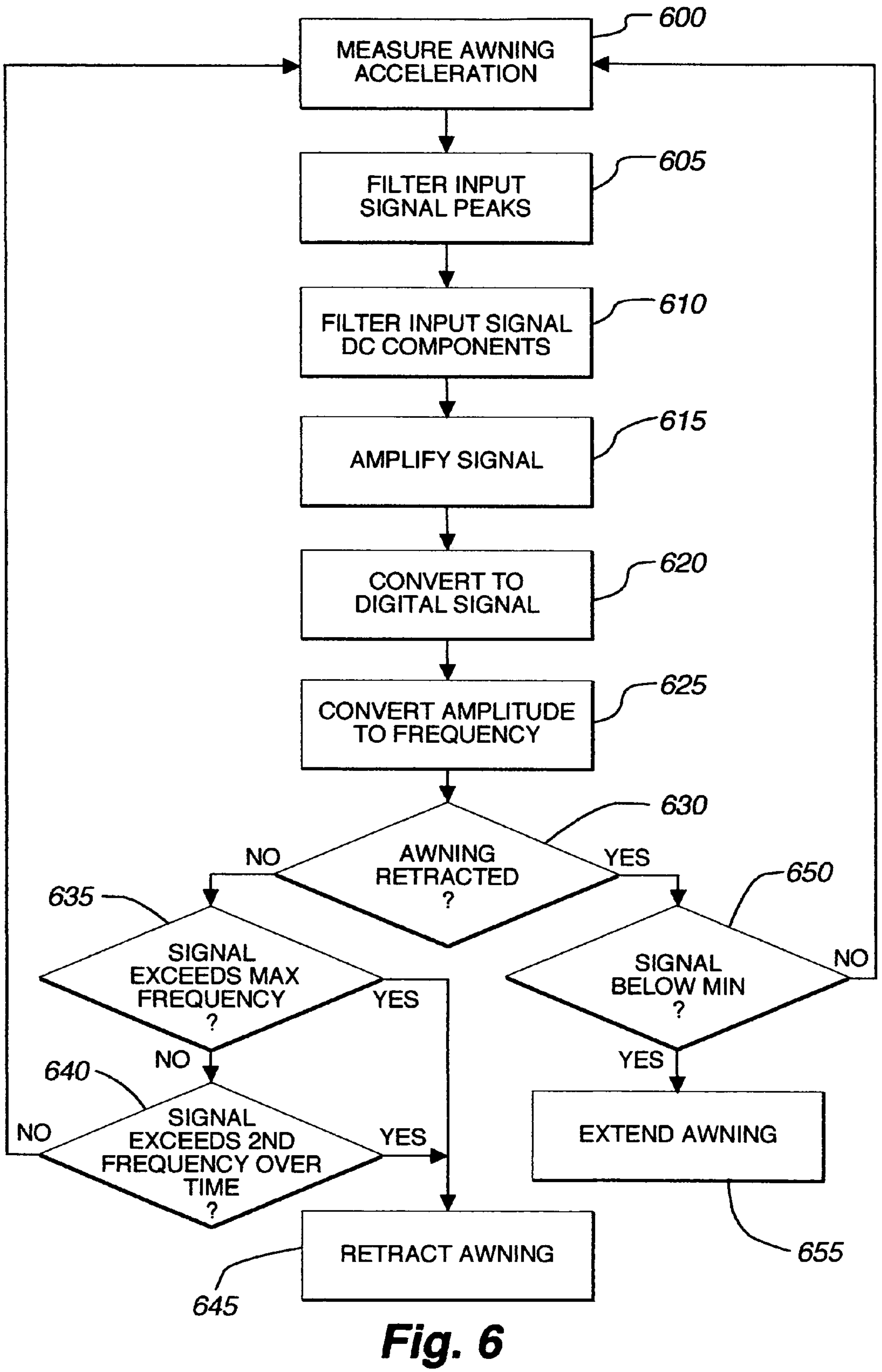
FIG. 6 is a flowchart depicting an exemplary method of operation for the apparatus of FIGS. 2 and 3.

FIG. 6 is a flowchart depicting an exemplary method of operation for the present embodiment. It should be understood that the various operations described with respect to FIG. 6 are intended as examples only. Alternate embodiments may omit one or more of the operations discussed herein, and/or may change the order in which the operations are carried out. Thus, the flowchart of FIG. 6 is but one manner in which an embodiment may operate, and is therefore exemplary rather than limiting.

The exemplary method of operation begins with operation 600, in which the awning's acceleration due to wind (or other) impact is measured. As wind impacts the awning 10, the awning generally shakes up and down, moving in a direction perpendicular to the awning's longitudinal axis. Since the piezoelectric sensor 90 is attached to the awning and is generally coplanar with the awning, the awning's motion is transferred to the sensor. Acceleration of the sensor creates the aforementioned electrical input signal. Thus, the piezoelectric sensor 90 measures the awning's acceleration in operation 600 and creates a corresponding input signal having both a frequency and amplitude. For reference, the frequency of the input signal indicates the frequency of the awning's motion while the input signal's amplitude indicates an acceleration of the awning 10. In other words, the input signal's frequency may be thought of as measuring the sustained wind force, while the input signal's amplitude indicates the maximum wind force operating on the awning.

Once the awning's acceleration is measured by the piezoelectric sensor 90 and a corresponding input signal generated, the input signal may be subjected to one or more filters and/or signal processing operations. These signal processing operations are set forth generally as operations 605–615. It should be noted operations 605–615 may occur in different orders than set forth herein.

In operation 605, the input signal is filtered to eliminate peak values of the signal above a certain threshold. Typically, this occurs by subjecting the input signal to a low-pass filter. The low-pass filter clips any portion of the signal above a certain frequency. Thus, high-frequency portions of the input signal/waveform will be filtered out in operation 605.

Since the piezoelectric sensor 90 is cantilevered within the casing 100, which in turn is mounted to the awning 10, the sensor may occasionally experience vibration not experienced by the awning. Given the relative difference between sensor 90 and awning 10 sizes and masses, the sensor may be more sensitive to smaller forces acting on the awning/casing structure than is the awning. Further, if the casing 100 is not securely fastened to the awning, the casing (and enclosed sensor) may sway or "bobble." Thus, the sensor may generate an input signal falsely indicating the awning is accelerating or moving, when in fact only the sensor is accelerating. Since the awning at least partially braces the casing and sensor, the swing of the sensor is relatively small if the awning does not also move. This typically results in very quick, sharp acceleration and deceleration of the sensor, which in turn creates a high-frequency input signal. Thus, subjecting the signal to a properly-tuned low-pass filter eliminates the relatively high frequencies of the input signal corresponding to motion of the piezoelectric sensor independent from awning motion.

Similarly, the piezoelectric sensor 90 may be subjected to relatively slow, gentle forces that may move the sensor but not the awning 10. As with the more abrupt, relatively weak forces just described, such gentle forces may cause the sensor 90 to falsely register awning motion when, in fact, only the casing 100 and/or sensor moves. This may occur, for example, when gentle gusts of wind act on an improperly-or poorly-mounted casing.

In order to prevent such forces from creating a false positive for the present embodiment 70, inaccurately indicating awning motion that does not occur, the input signal may be further processed. Specifically, the input signal may pass through a high-pass filter in operation 610, which removes low-frequency segments of the input signal that may be generated by the aforementioned gentle forces. Thus, the high-pass filter may remove a DC component from the input signal insofar as the DC component contains no relevant data.

In operation 615, the input signal may be amplified. In the present embodiment, the input signal is amplified with a gain of 8.0, but alternate embodiments may subject the input signal to amplification with a different gain.

It should also be noted that the input signal may be conditioned to remove direct current (DC) components from the signal. This may be performed, for example, by passing the signal through an appropriately-configured high-pass filter in addition to the high-pass filter discussed with respect to operation 605. Removing DC components from the input signal is entirely optional, but may enhance performance of the embodiment.

The signal may also be converted from an analog signal to a digital signal in operation 620. Generally, the aforementioned microcontroller accepts a digital input, which necessitates this analog-to-digital conversion. Alternative embodiments may employ elements, controllers, and/or circuitry that operate solely with analog inputs. Such embodiments may omit operation 620 without impact.

in operation 625, the input signal is converted by the present embodiment to a control signal. Essentially, the input signal's amplitude is converted to a frequency, typically by the aforementioned microcontroller. Some embodiments may employ an analog or digital amplitude-to-frequency converter, rather than a microcontroller. The conversion from amplitude to frequency is undertaken to ensure compatibility with currently-existing motor controllers. Many motor controllers, for example, are configured to accept an input/control signal from an anemometer. Typically, anemometers measure wind velocity, and output a signal having a frequency varying directly with wind speed. Thus, converting the amplitude of the present embodiment's input signal to a frequency may permit backwards compatibility. Alternative embodiments may omit such compatibility and perform operations 630–655 based on the amplitude of the input signal generated in step 600.

Still with respect to FIG. 6, in operation 630, the embodiment determines whether the awning is extended or retracted. If so, operation 645 is executed. Otherwise, the embodiment determines in operation 635 whether a maximum frequency is exceeded.

Generally, the present embodiment retracts the awning 10 under two conditions: first, when the awning experiences sufficiently abrupt motion that the awning may be damaged, regardless of the duration of the motion; and second, when the awning experiences sufficient motion across a set period of time. Operations 635 and 640 in the present flowchart correspond to these two criteria for retracting the awning.

In operation 635, the embodiment determines whether the control signal's frequency exceeds a maximum peak frequency. The peak frequency corresponds to the abrupt motion, and is generally not adjusted by a user via the control panel. If so, the awning is retracted in operation 645.

Otherwise, operation 640 is accessed and the embodiment determines whether the frequency of the control signal exceeds the maximum frequency chosen by the user from the aforementioned control panel. As previously mentioned with respect to FIG. 5, in the present embodiment a user may select from a variety of preset threshold levels, each of which instructs the motor controller to retract the awning when the awning experiences a given force generated by wind impact. Generally, the thresholds may be thought of as "high," "medium," and "low" levels of force. Thus, the user's selection from the control panel (or other appropriate device) indicates to the present embodiment the maximum frequency the control signal may reach before the awning is retracted. It should be noted the amplitude-to-frequency conversion may be omitted in some embodiments. In such case, many of the operations discussed herein (such as, for example, operations 635, 640, and so forth) may be carried out with respect to a signal's amplitude.

Presuming the control signal exceeds this maximum frequency, the awning is retracted in operation 645. Otherwise, the measuring, sampling, and detection procedure begins again from operation 600.

As discussed above with respect to operation 630, if the awning 10 is retracted operation 650 is accessed. In operation 650, the embodiment (typically via the microcontroller) determines whether the control signal's frequency is below a minimum frequency. If so, the wind speed has dropped below the threshold at which the awning may experience damage, and the awning may be safely extended in operation 655. Otherwise, the monitoring process begins again with operation 600.

It should be noted operations 630, 650, and 655 are entirely optional, and many embodiments may lack such operations. Some embodiments may monitor wind speed/awning acceleration only for the purposes of retracting the awning 10 to prevent damage, and leave extending the awning to the user. Yet other embodiments may employ operations 630, 650, and 655, but only if the embodiment previously retracted the awning. This may prevent the embodiment from abruptly extending the awning 10 when a user would prefer the awning in a retracted state.

Additionally, changing the location of the piezoelectric sensor 90 may prove advantageous in embodiments employing operations 630, 650, and 655. For example, properly weighting the casing 100 and attaching the casing to an independent arm or structure that remains extended even while the awning 20 is retracted may permit the piezoelectric sensor 90 to more accurately measure wind force while the awning 10 is extended, since the sensor would still be exposed to wind even when the awning is withdrawn. Alternately, the embodiment (possibly through operation of the microcontroller) may be configured to further condition the signal to take into account the retraction of the awning and the shielding effect this gives the sensor 90. For example, the control or input signals' gains may be increased further if the casing remains affixed to the awning rail and retracts with the awning, so that minor fluctuations in awning acceleration may be more accurately tracked. This, in turn, may provide more reliable data regarding wind speed and whether the awning may be extended.

Figure 7A:
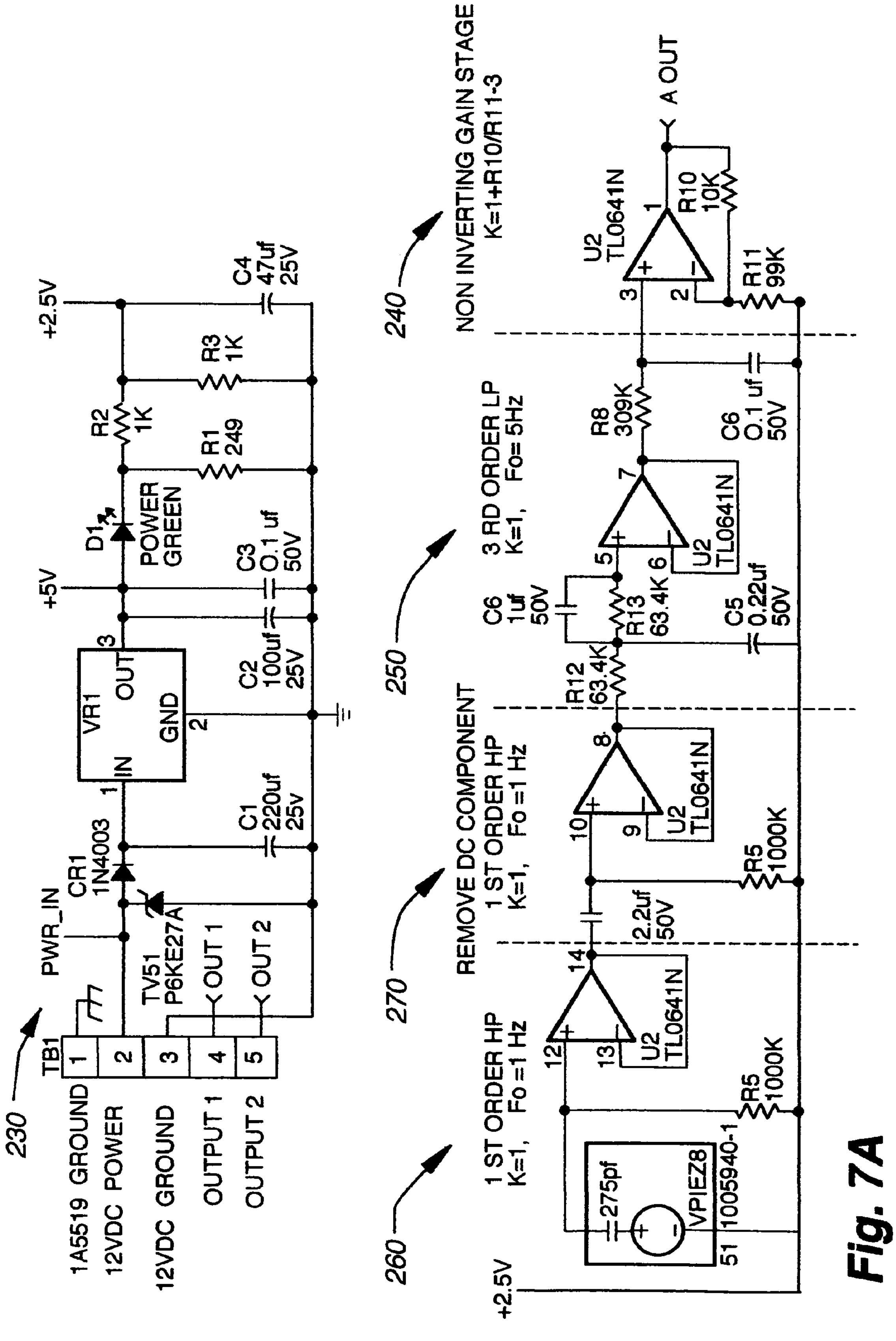
FIG. 7 is a circuit diagram of a first exemplary control circuit for processing an input signal generated by the apparatus of FIGS. 2 and 3.
Figure 7B:
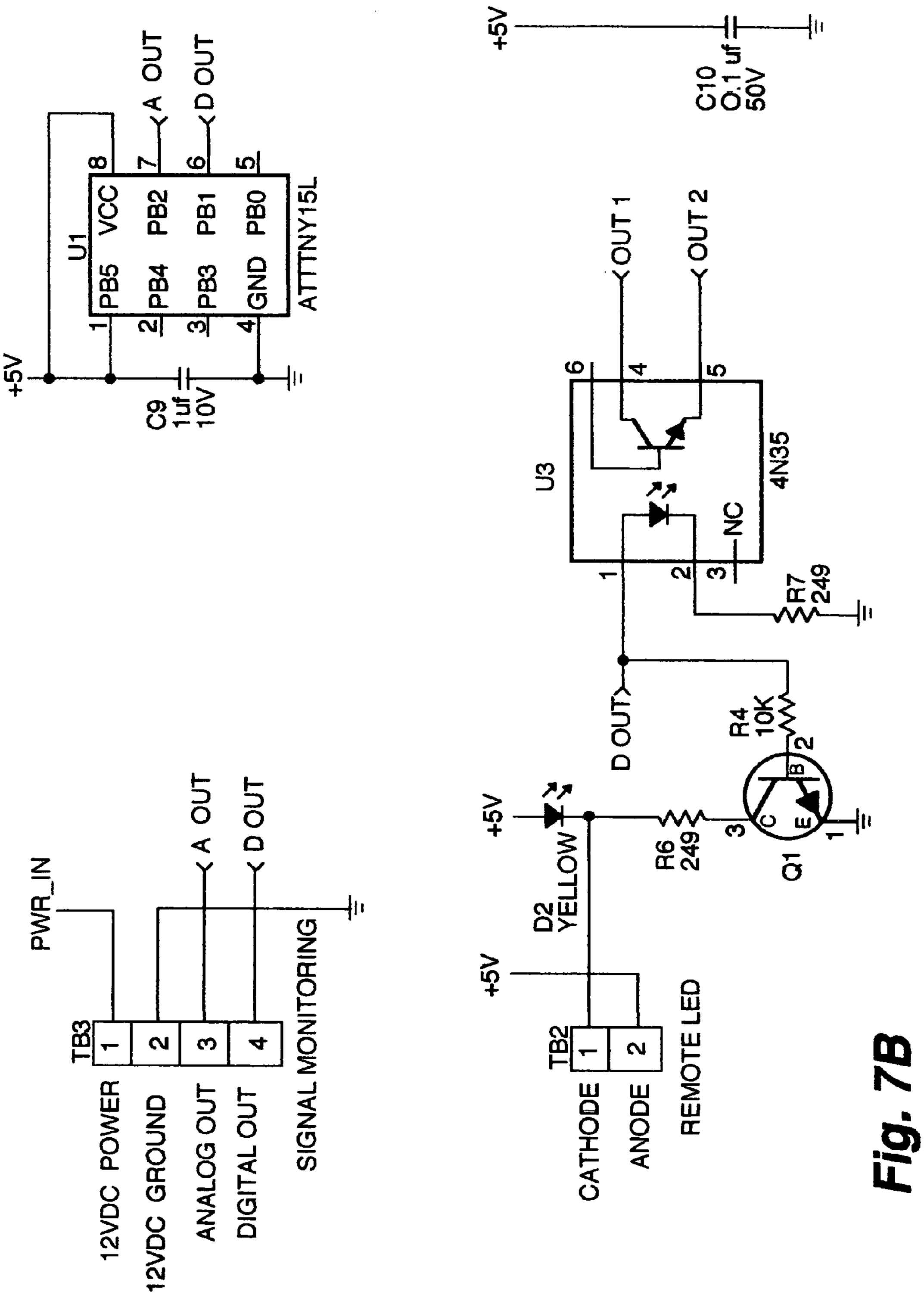

Turning now to FIG. 7, a diagram of an exemplary circuit 230 for conditioning the input signal generated by the piezoelectric controller 70 is depicted. The circuit 230 may also, for example, convert the signal into a form capable of being accepted and operated upon by existing awning control equipment.

The present circuit 230 performs multiple operations on the input signal. The circuit includes an amplifier 240, which amplifies the input signal's amplitude. In one version of the present embodiment, the amplifier has a gain of 8.0, meaning the signal's amplitude after passing through the amplifier is eight times its input amplitude. Alternative embodiments may vary the gain of the amplifier 240. The circuit also includes at least one lowpass filter 250, which prevents portions of the signal above a certain frequency from passing. Similarly, the circuit includes a highpass filter 260, preventing segments of the input filter below a certain cutoff frequency from passing. It should be noted the operations of the lowpass and highpass filters may be combined and replaced by a bandpass filter.

The conditioning circuit also includes an element 270 designed to remove any direct current (DC) waveform from the input signal. Finally, the circuit may include an analog-to-digital converter (not shown) to transform the analog input signal into a digital signal which may, for example, prove advantageous if a microcontroller or other digital processor interacts with the signal. Although the present embodiment subjects the input signal to the highpass filter 260, DC removal filter 270, lowpass filter 250, and amplifier 240, in that order, alternate embodiments may vary the order of circuit elements.

Figure 8:
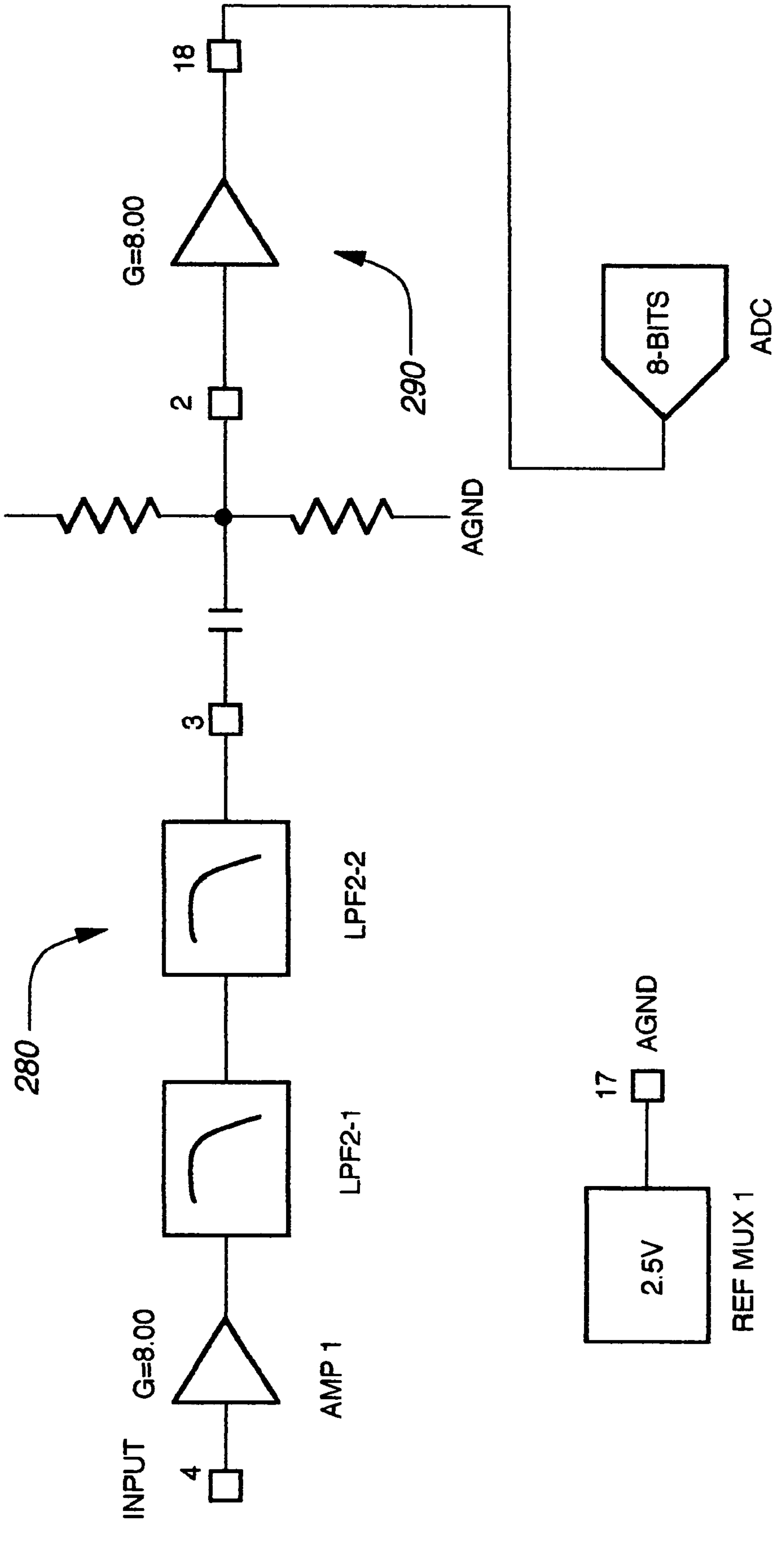
FIG. 8 is a second circuit diagram of a second exemplary control circuit for processing an input signal generated by the embodiment of FIGS. 2 and 3.

Alternate embodiments of the conditioning circuit 230 may omit one or more of the aforementioned circuit elements. For example, the embodiment 280 shown in FIG. 8 lacks a highpass filter 260. Similarly, alternate embodiments may amplify the signal additional times, as shown in FIG. 8 with the addition of a second gain amplifier 290.

It should be understood the present invention has been described with particular reference to exemplary embodiments and processes. Such embodiments and processes are intended to be exemplary, rather than limiting. Accordingly, the proper scope of the invention is defined by the appended claims.

What is claimed is:

1. A method for retracting an awning, comprising:
detecting an awning acceleration;
generating a first signal corresponding to the awning acceleration;
generating a second signal having at least one signal characteristic similar to a signal generated by an anemometer, the second signal based at least in part on the first signal; and
retracting the awning in the event the second signal satisfies a retracting condition.

2. The method of claim 1, the operation of retracting the awning comprising:
determining whether the second signal exceeds a first threshold for at least a set period of time; and
in the event the second signal does not exceed the first threshold, not retracting the awning; otherwise
retracting the awning.

3. The method of claim 2, the operation of retracting the awning further comprising:
determining whether the second signal exceeds a second threshold; and
in the event the second signal does not exceed the second threshold, not retracting the awning; otherwise
retracting the awning.

4. The method of claim 1, further comprising removing a direct current component from the first signal.

5. The method of claim 1, further comprising amplifying the first signal.

6. The method of claim 1, further comprising removing a frequency above a frequency threshold from the first signal.

7. The method of claim 6, further comprising removing a frequency below a frequency threshold from the first signal.

8. The method of claim 7, further comprising converting the first signal to a second signal, wherein:
the first signal is an analog signal;
the second signal is a digital signal; and
the second signal's frequency corresponds to the first signal's amplitude.

9. The method of claim 7, wherein the step of generating a first signal comprises:

accelerating a piezoelectric element operably connected to the awning; and in response to accelerating the piezoelectric element, generating the first signal.

10. The method of claim 1, wherein the step of generating a first signal comprises:

accelerating a piezoelectric element operably connected to the awning; and producing the first signal from the acceleration of the piezoelectric element.

11. The method of claim 10, wherein an amplitude of the first signal varies with the acceleration of the piezoelectric element.

12. The method of claim 11, wherein the signal characteristic is a frequency.

13. The method of claim 1, wherein the operation of converting the first signal to a second signal having at least one signal characteristic similar to a signal generated by an anemometer comprises:

determining an amplitude of the first signal; and producing a second signal having a frequency varying with the amplitude of the first signal.

14. The method of claim 1, further comprising the operation of removing any frequencies above a frequency threshold from the first signal.

15. The method of claim 14, further comprising the operation of removing any frequencies below a frequency threshold from the first signal.

16. The method of claim 15, further comprising amplifying the first signal.

17. The method of claim 1, wherein:

the first signal is an analog signal;

the second signal is a digital signal; and the second signal's frequency is proportional to the amplitude of the first signal.

18. The method of claim 1, further comprising:

determining if the second signal's frequency exceeds a first threshold for a first time; and in the event the second signal's frequency exceeds the first threshold for the first time, retracting the awning.

19. The method of claim 18, further comprising:

determining if the second signal's frequency exceeds a second threshold at any time; and in the event the second signal's frequency exceeds the second threshold at any time, retracting the awning.

20. The method of claim 1, further comprising setting the first threshold equal to a user-selected level.

21. An apparatus for retracting an awning, comprising:

a piezoelectric element operative to generate an input signal corresponding to an awning acceleration;

a conditioning circuit operative to accept the input signal from the piezoelectric element and generate a conditioned signal therefrom, the conditioned signal having at least one signal characteristic similar to a signal generated by an anemometer;

a conversion circuit operative to accept the conditioned signal and generate an output signal; and a motor control operative to accept the conditioned signal and retract the awning in response thereto.

22. The apparatus of claim 21, further comprising:

a microcontroller operative to determine whether a threshold is exceeded by the conditioned signal and generate a control signal in response; wherein the motor is operative to accept the control signal and retract the awning in response thereto.

23. The apparatus of claim 21, wherein the piezoelectric element is affixed to the awning.

24. The apparatus of claim 23, wherein the piezoelectric element measures the awning acceleration.

25. The apparatus of claim 21, wherein the conditioning circuit comprises:

a lowpass filter operative to filter high frequency portions of the input signal; and a highpass filter operative to filter low frequency portions of the input signal, the highpass filter operatively connected to the lowpass filter.

26. The apparatus of claim 25, wherein the conditioning circuit further comprises:

an amplifier operative to amplify the input signal; and an analog-to-digital converter operative to convert the input signal to a digital conditioned signal.

27. The apparatus of claim 21, wherein the conversion circuit further comprises a microcontroller operative to accept the signal produced by the conditioning circuit and generate a digital output signal, the digital output signal having a frequency proportional to the conditioned signal.

28. The apparatus of claim 27, wherein a frequency of the digital output signal generally falls within a frequency range of a velocity signal produced by an anemometer.

29. The apparatus of claim 21, wherein:

the motor control is operative to determine whether the frequency of the digital output signal exceeds a first threshold for a first time; and in the event the first threshold is exceeded for the first time, the motor control is further operative to retract the awning.

30. The apparatus of claim 29, wherein:

the motor control is further operative to determine if a frequency of the digital output signal exceeds a second threshold at any time; and in the event the second maximum threshold is exceeded at any point in time, the motor control is further operative to retract the awning.

31. The apparatus of claim 29, further comprising an input device operative to select the first threshold.

32. The apparatus of claim 31, wherein the input device comprises a visual indicator of the first threshold.

33. An apparatus for retracting an awning, comprising:

a piezoelectric element operative to generate an input signal at least partially based on an acceleration of the awning;

a conditioning circuit operative to accept the input signal from the piezoelectric element and generate a conditioned signal therefrom, the conditioned signal having at least one signal characteristic similar to a signal generated by an anemometer;

a motor controller operative to accept the conditioned signal and instruct a motor to retract the awning in response thereto; wherein the conditioning circuit comprises:

a lowpass filter operative to filter high frequency portions of the input signal; and a highpass filter operative to filter low frequency portions of the input signal, the highpass filter operatively connected to the lowpass filter.

34. The apparatus of claim 33, wherein the conditioning circuit further comprises:

an amplifier to amplify the input signal; and an analog-to-digital converter operative to convert the input signal to a digital conditioned signal.

* * * * *